US006633695B2

(12) United States Patent
Bailey et al.

(10) Patent No.: US 6,633,695 B2
(45) Date of Patent: Oct. 14, 2003

(54) COMPRESSION-TUNED GRATING-BASED OPTICAL ADD/DROP MULTIPLEXER

(75) Inventors: Timothy J. Bailey, Longmeadow, MA (US); Mark R. Fernald, Enfield, CT (US); Alan D. Kersey, South Glastonbury, CT (US); Trevor W. MacDougall, Simsbury, CT (US); Martin A. Putnam, Cheshire, CT (US); Paul E. Sanders, Madison, CT (US)

(73) Assignee: CiDRA Corporation, Wallingford, CT (US)

( * ) Notice: Subject to any disclaimer, the term of this patent is extended or adjusted under 35 U.S.C. 154(b) by 0 days.

(21) Appl. No.: 09/800,918

(22) Filed: Mar. 6, 2001

(65) Prior Publication Data
US 2001/0051019 A1 Dec. 13, 2001

Related U.S. Application Data

(63) Continuation-in-part of application No. 09/519,220, filed on Mar. 6, 2000.

(51) Int. Cl.[7] ............................... G02B 6/28; G02B 6/34
(52) U.S. Cl. ............................ 385/24; 385/37; 359/130
(58) Field of Search .......................... 385/31, 32, 12, 385/13, 24, 37; 359/124, 127, 130

(56) References Cited

U.S. PATENT DOCUMENTS 5,706,375 A * 1/1998 Mihailov et al. ............. 385/24
5,812,711 A * 9/1998 Glass et al. ................. 385/37
6,360,042 B1 * 3/2002 Long ........................... 385/37

* cited by examiner

Primary Examiner—Hemang Sanghavi

(57) ABSTRACT

A compression-tuned fiber Bragg grating based reconfigurable wavelength add/drop module has a compression force assembly and an all-glass Bragg grating compression unit having gratings spaced along an axis of compression. The compression force assembly responds to a control electronics signal containing information about a selected wavelength of a channel to be added to or dropped from an optical traffic signal, for providing a compression force applied along the axis of compression. The compression unit responds to the optical traffic signal and the compression force, for providing an all-glass Bragg grating compression unit optical signal having the selected wavelength of the channel to be added to or dropped from the optical traffic signal. The compression unit optical signal may include either the traffic with an added reflected channel(s), or a dropped reflected channel(s). The compression unit is a "dogbone" structure having either a glass tube with an optical fiber fused therein, or a single large diameter waveguide having a core. The core of the optical fiber or waveguide has the gratings spaced therein. The axis of compression is parallel with the longitudinal axis of the dogbone structure.

39 Claims, 7 Drawing Sheets

COMPRESSION-TUNED GRATING-BASED OPTICAL ADD/DROP MULTIPLEXER

CROSS REFERENCES TO RELATED APPLICATIONS

This is a continuation-in-part of U.S. patent application Ser. No. 09/519,220 entitled "Compression-Tuned Bragg Grating Based Reconfigurable wavelength Channel Add/Drop Multiplexer", filed Mar. 6, 2000 (CC-0204), which is hereby incorporated herein by reference in its entirety.

TECHNICAL FIELD

The present invention relates to optical add/drop multiplexer devices, and more particularly, an optical add/drop multiplexer (OADM) using a large diameter waveguide for dynamically adding and dropping optical signals from a WDM optical signal.

BACKGROUND ART

The telecommunications industry is undergoing dramatic changes with increased competition, relentless bandwidth demand, and a migration toward a more data-centric network architecture. First generation point-to-point wave division multiplex systems have eased the traffic bottleneck in the backbone portion of a network. As a new cross-connect architecture moves the technology closer to the subscriber side of the network, operators are challenged to provide services at the optical layer, calling for more flexible networks that can switch and reroute wavelengths. This is placing great emphasis and demand for wavelength agile devices, of which compression-tuned grating devices could play a major role.

The need to provide services "just in time" by allocation of wavelengths, and further migration of the optical layer from the high-capacity backbone portion to the local loop, is driving the transformation of the network toward an all optical network in which basic network requirements will be performed in the optical layer.

The optical network is a natural evolution of point-to-point dense wavelength division multiplexing (DWDM) transport to a more dynamic, flexible, and intelligent networking architecture to improve service delivery time. The main element of the optical network is the wavelength (channel), which will be provisioned, configured, routed, and managed in the optical domain. Intelligent optical networking will be first deployed as an "opaque" network in which periodic optical-electrical conversion will be required to monitor and isolate signal impairments. Longer range, the optical network will evolve to a "transparent" optical network in which a signal is transported from its source to a destination totally within the optical domain.

A key element of the emerging optical network is an optical add/drop multiplexer (OADM). An OADM will drop or add specific wavelength channels without affecting the through channels. Fixed OADMs can simplify the network and readily allow cost-effective DWDM migration from simple point-to-point topologies to fixed multi-point configurations. True dynamic OADM, in which reconfiguration is done in the optical domain without optical-electrical conversion, would allow dynamically reconfigurable, multi-point DWDM optical networks. This dynamically reconfigurable multi-point architecture is slated to be the next major phase in network evolution, with true OADM an enabling network element for this architecture.

One known commercially is a fixed all-optical OADM that couples fixed optical channel filters, usually fiber Bragg gratings, to passive optical routing and branching components such as couplers and circulators. The fiber Bragg gratings are not tuned to filter different wavelengths.

A tunable grating/circulator approach for dynamically reconfigurable OADM has also been pursued in the prior art by thermal or strain tuning the grating. These dynamic or programmable all-optical OADM designs are based on tunable gratings. But thermal tuning is slow and difficult to maintain and control wavelength to the tolerances required in current DWDM systems that feature sub-nanometer channel spacing. Strain tuning approaches, in which the fiber grating is mechanically stretched, have also proved difficult to maintain and control and tune wavelengths due to fiber attachment challenges and slight mechanical creep that cause errors and slippage. The reliability of a fiber being held under tension for extended periods of time is questionable and controversial for use in the industry.

Ball, in U.S. Pat. No. 6,020,986, shows an add/drop module having a circulator 16, an array of tunable fiber Bragg gratings, a piezoelectric device and a controller, which is incorporated herein by reference. Strain is applied by coupling the piezoelectric device to each fiber Bragg grating, and adjusting the current applied to each piezoelectric device from the controller. The wavelength of the grating may be adjusted ("tuned") in the nanometer range for gratings having a wavelength of about 1540 nanometers. However, Ball does not disclose how the piezoelectric device is physically coupled to the fiber Bragg gratings to apply strain. See also U.S. Pat. No. 5,579,143, issued to Huber, and U.S. Pat. No. 5,748,349, issued to Mizrahi, which disclose OADM systems having tunable optical filters, which are incorporated herein by reference.

Moreover, the grating/circulator approach for OADM has emerged as a viable method over other OADM techniques such as optical switches and arrayed waveguide devices, which are broadband in nature. Combinations of switches and wavelength multiplexers achieve wavelength, selection but suffer from other performance problems such as high optical losses and high cost.

Despite intense efforts, dynamic OADMs of such types remain elusive due to inherent performance issues, particularly drift and reliability, than thermal or tension grating tuning approaches. The inadequacy of thermal and tension-based grating tuning methods to control and maintain wavelength to tight tolerances would require some sort of in-line signal diagnostic, such as a wavelength monitoring device or spectrum analyzer, to provide feedback and referencing for closed loop control of the grating wavelength.

SUMMARY OF THE INVENTION

In accordance with an embodiment of the present invention, an optical drop filter includes a compression-tuned optical device. The compression tuned optical device includes an optical waveguide, which has an inner core disposed within an outer cladding and a grating disposed within the inner core. The grating reflectd a first reflection wavelength of light back along the inner core and propagates the remaining wavelengths of light through the grating. The optical waveguide includes a pair of opposing surfaces. The optical waveguide also includes a compressing device that compresses the optical waveguide for compressing the opposing surfaces towards each other to tune the grating and change the reflection wavelength of light reflected back along the inner core. The drop filter also includes an optical directing device for providing an input optical signal to the compression-tuned optical device. The input optical signal has a plurality of optical channels centered at spaced wavelengths. The compression-tuned optical device removes an optical channel from the input optical signal.

In accordance with another embodiment of the present invention, an optical add filter includes a compression-tuned optical device, which has an optical waveguide. The optical waveguide includes an inner core disposed within an outer cladding and a grating disposed within the inner core. The grating reflects a first reflection wavelength of light back along the inner core and propagates the remaining wavelengths of light through the grating. The optical waveguide includes a pair of opposing surfaces. A compressing device compresses the opposing surfaces of the optical waveguide to tune the grating and change the reflection wavelength of light reflected back along the inner core. An optical directing device is optically connected to the compression-tuned optical device for combining an input optical signal and an added optical channel. The input optical signal has a plurality of optical channels centered at spaced wavelengths. The compression-tuned optical device provides the optical channel to be combined with the input optical signal to provide a combined output signal.

In accordance with another embodiment of the present invention, an optical add/drop multiplexer includes a compression-tuned optical device that has an optical waveguide. The optical waveguide includes an inner core disposed within an outer cladding and a grating disposed within the inner core. The grating reflects a first reflection wavelength of light back along the inner core and propagates the remaining wavelengths of light through the grating. The optical waveguide includes a pair of opposing surfaces. A compressing device compresses the optical waveguide to compress the opposing surfaces towards each other to tune the grating and to change the reflection wavelength of light reflected back along the inner core. An optical directing device is optically connected to the compression-tuned optical device for combining an input optical signal and an added optical channel. The input optical signal has a plurality of optical channels centered at spaced wavelengths. The compression-tuned optical device provides the optical channel to be combined with the input optical signal to provide a combined output signal.

In accordance with another embodiment of the present invention, a compression-tuned optical add/drop module includes a compression device for providing a compression force applied along an axis of compression. A grating compression unit having a grating along the axis of compression is responsive to the optical input signal, and further responsive to the compression force, for providing a grating compression unit optical signal having the selected wavelength of the channel to be added to or dropped from the input signal.

The foregoing and other objects, features and advantages of the present invention will become more apparent in light of the following detailed description of exemplary embodiments thereof, as illustrated in the accompanying drawing.

DETAILED DESCRIPTION OF THE INVENTION

Figure 3:
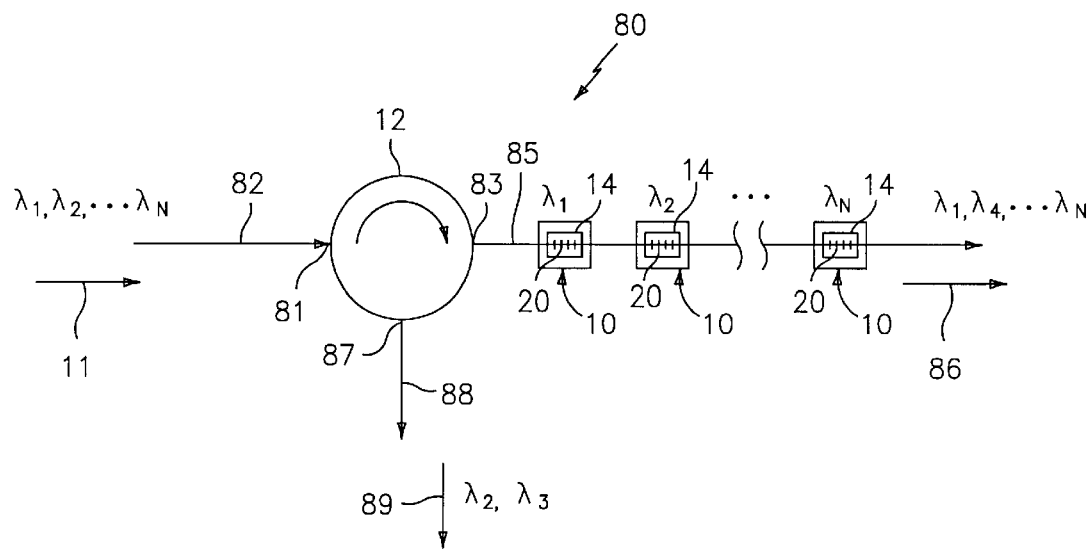
FIG. 3 is a block diagram of a tunable drop filter in accordance with tide present invention.
Figure 4:
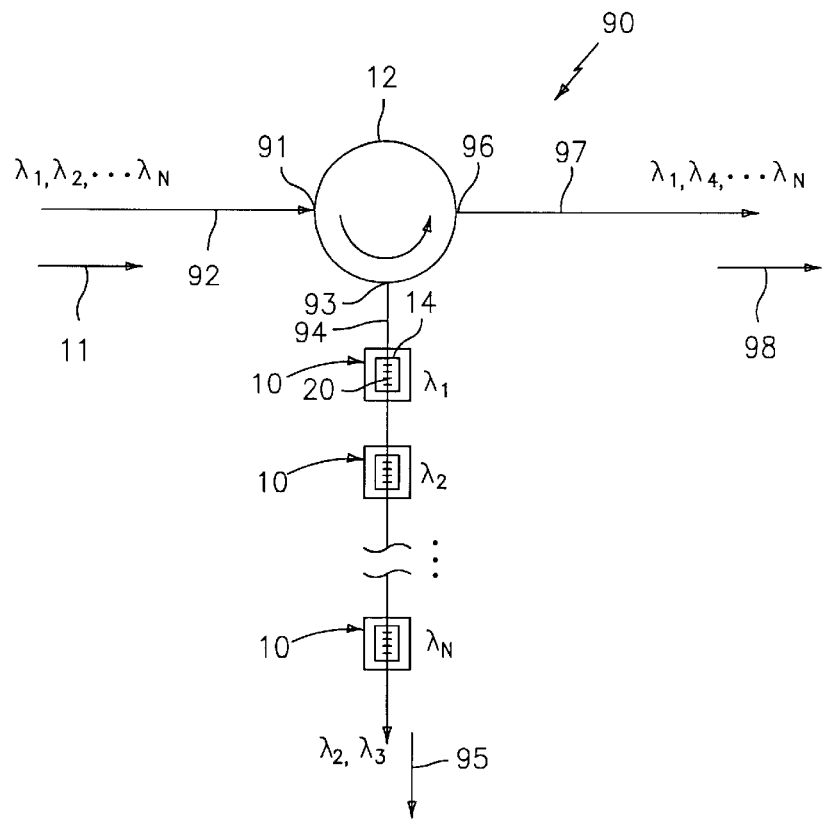
FIG. 4 is a block diagram of another embodiment of a tunable drop filter in accordance with the present invention.

FIGS. 3 and 4 show respective embodiments of tunable drop filters 80, 90 that filter or drop at least one wavelength band or optical channel of light, which is centered at a respective channel wavelength, from a WDM optical input signal 11. FIGS. 5–8 show respective embodiments of tunable add filters 100,110,120,130 that add or combine at least one optical channel to a WDM optical input signal 11. As shown in FIGS. 9–13, the tunable drop and add filters 80,90,100,110,120,130 maybe combined in a number ways to provide a reconfigurable optical add/drop multiplexer (ROADM) 140,150,160,170,180.

Figure 1:
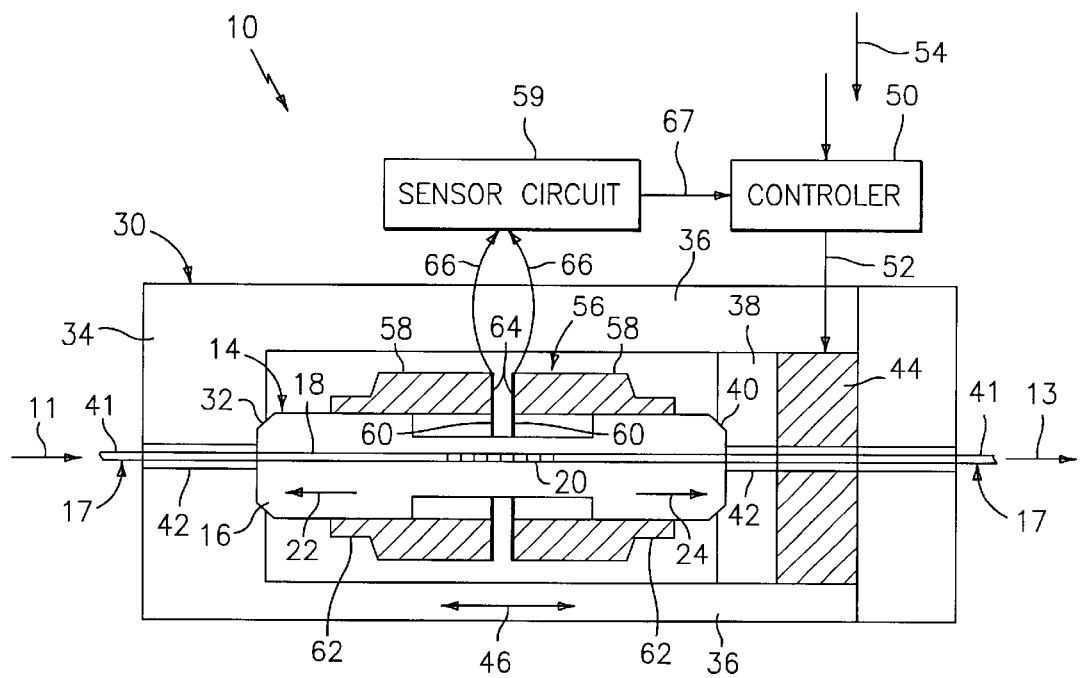
FIG. 1 is a side view of a tunable grating unit of a tunable optical filter and a block diagram of a positional/force feedback control circuit in accordance with the present invention.
Figure 2:
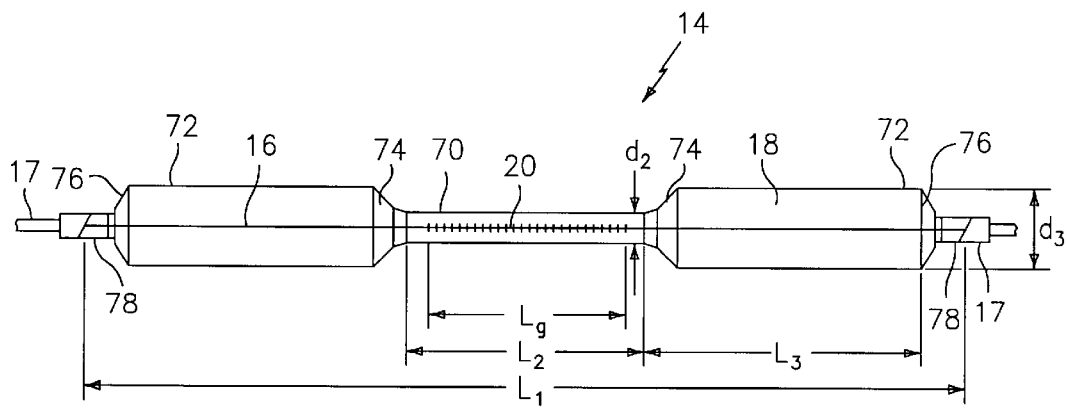
FIG. 2 is a side view of a grating element of a tunable optical filter in accordance with the present invention.

Referring to FIGS. 1 and 2, each of the tunable drop filters, add filter and ROADMs shown in FIGS. 3–13 include at least one tunable Bragg grating unit 10, optically coupled to a port of an optical directing device 12,13 (see FIGS. 3–6), such as a 3 or 4-port circulator, or optical coupler 15. The grating unit 10 tunes a grating element 14, which is a bulk or large diameter optical waveguide, having an outer cladding 18 and an inner core 16 disposed therein, having a single mode. The grating element 14 has an outer diameter of at least 3 mm and comprises silica glass ($SiO_2$) having the appropriate dopants, as is known, to allow light 11 to propagate along the inner core 16. The grating element (large diameter optical waveguide) may be formed by using fiber drawing techniques now know or later developed that provide the resultant desired dimensions for the core and the outer dimensions discussed hereinbefore, similar to that disclosed in co-pending U.S. patent application Ser. No. 09/455,868 entitled "Large Diameter Optical Waveguide, Grating, and Laser". The grating element may then be etched, grounded or machined to form a "dogbone" shape, as will be described in greater detail hereiafter. A pair of fibers or "pigtails" 17 may be attached to the ends of the grating element 14 by known techniques, such as epoxy or glass fusion)

Alternatively, the optical grating element 14 may be formed by heating, collapsing and fusing a glass capillary tube to a fiber (not shown) by a laser, filament, flame, etc., as is described in copending U.S. patent application Ser. No. 09/455,865, entitled "Tube-Encased Fiber Grating", which is incorporated herein by reference. Other techniques may be used for collapsing and fusing the tubes to the fiber, such as is discussed in U.S. Pat. No. 5,745,626, entitled "Method For And Encapsulation Of An Optical Fiber", to Duck et al., and/or U.S. Pat. No. 4,915,467, entitled "Method of Making Fiber Coupler Having Integral Precision Connection Wells", to Berkey, which are incorporated herein by reference to the extent necessary to understand the present invention, or other techniques. Alternatively, other techniques may be used to fuse the fiber to the tube, such as using a high temperature glass solder, e.g., a silica solder (powder or solid), such that the fiber, the tube and the solder all become fused to each other, or using laser welding/fusing or other fusing techniques.

The grating element 14 includes a reflective element 20, such as a Bragg grating, is written (embedded or imprinted) into the inner core 16 of the grating element 14. The Bragg grating 20 reflects back a portion the input light 11 as indicated by a line 22 having a predetermined wavelength band of light centered at a reflection wavelength $\lambda_b$, and passes the remaining wavelengths of the incident light 13 (within a predetermined wavelength range), as indicated by a line 24. The grating 20, as is known, is a periodic or aperiodic variation in the effective refractive index and/or effective optical absorption coefficient of an optical waveguide, such as that described in U.S. Pat. Nos. 4,725, 110 and 4,807,950, entitled "Method for Impressing Gratings Within Fiber Optics", to Glenn et al; and U.S. Pat. No. 5,388,173, entitled "Method and Apparatus for Forming Aperiodic Gratings in Optical Fibers", to Glenn, which are hereby incorporated by reference to the extent necessary to understand the present invention.

However, any wavelength-tunable grating or reflective element 20 embedded, written, etched, imprinted, or otherwise formed in the inner core 16 may be used if desired. As used herein, the term "grating" means any of such reflective elements. Further, the reflective element (or grating) 20 may be used in reflection and/or transmission of light.

Other materials and dimensions for the optical grating element 14 may be used if desired. For example, the grating element 14 may be made of any glass, e.g., silica, phosphate glass, or other glasses, or made of glass and plastic, or solely plastic.

The grating element 14 is axially compressed by a compression device or housing 30, similar to that described in U.S. patent application Ser. No. 09/707,084, entitled "Compression-Tuned Bragg Grating Based Laser" (CiDRA Docket No. CC-0129D). One end of the grating element 14 is pressed against a seat 32 in one end 34 of the housing 30. The housing also has a pair of ants (or sides) 36, which guide a movable block 3. The block 38 has a seat 40 that presses against the other end of the grating element 14. The axial end faces of the grating element 14 and/or the seats on mating surfaces 32,40 may be plated with a material that reduces stresses or enhances the mating of the grating element 14 with the seat on the mating surfaces. The ends of the housing 30 and the block 38 have a bore 42 drilled through them to allow the fiber 41 to pass therethrough. Instead of the recessed seats 32,40, the end 34 of the housing 30 and the block 38 may provide a planar surface for engaging flush with the respective ends of the grating element 14.

The housing 30 may be assembled such that a pre-strain or no pre-stain exists on the grating element 14 prior to applying any outside forces.

An actuator 44, such as a piezoelectric actuator, engages the moveable block 38, which causes the block to move as indicated by arrows 46. Accordingly, the PZT actuator 44 provides a predetermined amount of force to the moving block 38 to compress the grating element 14, and thereby tune the grating 20 to desired a reflection wavelength. In response to control signal generated by a displacement control circuit or controller 50 via conductor 52, the PZT actuator 44 is energized to provide the appropriate compression force necessary to tune the grating element to the desired Bragg reflection wavelength of the grating 20. The control circuit 50 adjusts the expansion and retraction of the actuator 44 in response to an input command 54 and a displacement sensor 56 that provides feedback representative of the strain or compression of the grating element 14 to form a non-optical closed-loop control configuration. In other words, light 11 propagating through the network or device is not used to provide feedback for the tuning of the grating 20.

In one embodiment, the displacement sensor 56 includes a pair of capacitive elements 58 and a displacement sensor circuit 59, similar to that disclosed in co-pending U.S. patent application Ser. No. 09/519,802 entitled, "Tunable Optical Structure Featuring Feedback Control", filed Mar. 6, 2000, which is incorporated by reference in its entirety. As shown in FIG. 1, each capacitive element 58 is generally tubular having an annular capacitive end surface 60 The capacitive elements 58 are mounted to respective ends of the grating element 14 at 62 such that the capacitive surfaces 60 are spaced a predetermined distance apart, for example, approximately 1–2 microns. Other spacings may be used if desired. The capacitive elements 58 may be bonded or secured using an epoxy or other adhesive compound, or fused to grating element 14 using a $CO_2$ laser or other heating element. The capacitive surfaces 60 are coated with a metallic coating, such as gold, to form a pair of annular capacitive plates 64. The change in capacitance depends on the change in the spacing between the capacitive plates.

Electrodes 66 are attached to the capacitive plates 64 to connect the capacitor to the displacement sensor circuit 59. The sensor circuit 59 measures the capacitance between the capacitive plates 64; and provides a sensed signal 67, indicative of the measured capacitance, to the displacement controller 50. As the grating element 14 is strained, the gap between the parallel capacitive plates 64 will vary, thereby causing the capacitance to change correspondingly. Specifically, as the grating is compressed, the gap between the capacitive plates 64 is reduced, resulting in an increase in capacitance. The change in capacitance is inversely proportional to the change in the reflection wavelength $\lambda_b$ of the grating 20. Since the capacitive elements 58 are directly connected to the grating element 14, the capacitive elements are passive and will not slip. One skilled in the art would be able to implement without undue experimentation, the sensor electronics circuit 59 to measure the change in capacitance between the two capacitive plates 64, In the operation of the grating unit 10, the controller 50 receives the wavelength input signal 54, which represents the desired reflection wavelength to tune the grating unit. In response to the input signal 54 and the sensed signal 67, which is representative of the present reflection wavelength of the grating 20, the controller 50 provides a control signal 52 to the actuator 44 to increase or decrease the compression force applied to the grating element 14 to set the desired reflection wavelength of the grating 20. The change in applied force to the grating element 14 changes the spacing between the ends of the grating 20, and therefore, the spacing between the capacitive plates 64. As described above, the change in spacing of the capacitive plates 64 changes the capacitance therebetween provided to the sensor circuit 59, which provides displacement feedback to the controller 50. While the sensor circuit 59 and the controller 50 has been shown as two separate components, one would recognize that the functions of these components may be combined into a single component. One example of a closed loop actuator 44 that may be used is Model No. CM (controller) and DPT-C-M (for a cylindrical actuator) made by Queensgate, Inc. of N.Y.

Although the invention has been described with respect to using a capacitor 56 to measure the gap distance, it should be understood by those skilled in the art that other gap sensing techniques may be used, such as inductive, optical, magnetic, microwave, time-of-flight based gap sensors. Moreover, the scope of the invention is also intended to include measuring or sensing a force applied on or about the compressive element, and feeding it back to control the compression tuning of the optical structure. While the embodiment of the present invention described hereinbefore includes means to provide feedback of the displacement of a grating element 20, one should recognize that the grating units may be accurately and repeatably compressed and thus may operate in an open loop mode.

Alternatively, instead of using a piezoelectric actuator 44, the grating element 14 may be compressed by another actuator, such as a solenoid, pneumatic force actuator, or any other device that is capable of directly or indirectly applying an axial compressive force on the grating element 14. Further, a stepper motor or other type of motor whose rotation or position can be controlled may be used to compress the grating element A mechanical linkage connects the motor, e.g., a screw drive, linear actuator, gears, and/or a cam, to the movable block 38 (or piston), which cause the block to move as indicated by arrows 46, similar to that described in pending U.S. patent application Ser. No. 09/751,589 entitled "Wide Range Tunable Optical Filter", filed Dec. 29, 2000 (CC-0274A); and U.S. patent application Ser. No. 09/752,332 entitled "Actuator Mechanism for Tuning an Optical Device", filed Dec. 29, 2000. (CC-0322), which are incorporated herein by reference. The stepper motor may be a high resolution stepper motor driven in a microstepping mode, such as that described in the aforementioned U.S. Pat. No. 5,469,520, "Compression Tuned Fiber Grating", to Morey et al, (e.g., a Melles Griot NANOMOVER), incorporated herein by reference, As shown in FIG. 2, the grating element 14 may have a "dogbone" shape having a narrow central section 70 and larger outer sections 72. Advantageously, the dogbone shape provides increased sensitivity in converting force applied by the actuator 44 to assure accurate tuning of the grating 20. The narrow section 70 may have an outer diameter d2 of about 0.8–1 mm, and a length L2 of about 5–20 mm. The large sections 72 each have a diameter d3 of about 2–3 mm and a length L3 of about 2–5 mm. The overall length L1 is about 10–30 mm and the multi-component grating has a length Lg of about 5–20 mm. Other lengths and diameters of the sections 70,72 may be used. Other dimensions and lengths for the grating element 14 and the multi-component grating may be used, An inner transition region 74 of the large sections 72 may be a sharp vertical or angled edge or may be curved. A curved geometry has less stress risers than a sharp edge and thus may reduce the likelihood of breakage. Also, the large sections 72 may have the outer fluted sections 76 at the ends.

We have found that such a dimension change between the dimension d3 of the large section 72 and the dimension d2 of the narrow section 70 provides increased force to grating wavelength shift sensitivity (or gain or scale factor) by strain amplification. Also, the dimensions provided herein for the dogbone are easily scalable to provide the desired amount of sensitivity.

The dimensions and geometries for any of the embodiments described herein are merely for illustrative purposes and, as such, any other dimensions may be used if desired, depending on the application, size, performance, manufacturing requirements, or other factors, in view of the teachings herein.

The grating element 14 may have tapered (or beveled or angled) outer corners or edges 76 to provide a seat for the grating element 14 to mate with housing 30 and moving block 38 and/or to adjust the force angles on the grating element, or for other reasons. The angle of the beveled corners 76 is set to achieve the desired function. In addition, one or both of the axial ends of the grating element 14 where the fiber 41 attaches may have an outer tapered (or fluted, conical, or nipple) axial section 78

For the grating element 14 formed by collapsing a tube onto a fiber, the Bragg grating may be written in the fiber before or after the capillary tube is encased around and fused to the fiber, such as is discussed in copending U.S. patent application Ser. No. 09/455,865, entitled "Tube-Encased Fiber Grating", filed Dec. 6, 1999 (CiDRA Docket No. CC-0078B), which is incorporated herein by reference. If the grating 20 is written in the fiber after the tube is encased around the grating, the grating may be written through the tube into the fiber by any desired technique, such as is described in copending U.S. patent application Ser. No. 09/205,845, entitled "Method and Apparatus For Forming A Tube-Encased Bragg Grating", filed Dec. 4, 1998, (CiDRA Docket No. CC-0130) which is incorporated herein by reference.

While the tunable grating units 10 are actively tuned to provide a reconfigurable optical add/drop multiplexer (ROADM), one will appreciate and recognize the present invention contemplates substituting the tunable grating units with athermal grating units, which passively tune the grating element 14 to maintain the reflection wavelength of the grating 20 over a predetermined temperature range to provide a fixed optical add/drop multiplexer (FOADM) The athermal grating unit is similar to that disclosed in U.S. patent application Ser. No. 09/699,940 entitled "Temperature Compensated Optical Device" filed Oct. 30, 2000 (CC-0234A), which is incorporated herein by reference. The invention also contemplates that some or all the grating units may be substituted for the athermal grating units.

Referring to FIG. 3, tie tunable drop filter 80 includes a plurality of tunable Bragg grating units 10, optically coupled in series to a port of an optical directing device 12, such as a 3-port circulator. At least one grating unit 10 is actuated to compress a respective grating element 14, and therefore, tune a respective grating 20 to reflect the desired optical channel(s) to be dropped, from the optical input signal 11, while the other grating units 10 are tuned or parked to pass the remaining channels of the input signal 11.

In the operation of the drop filter 80, a first port 81 of the circulator 12 receives the input signal 11, having optical channels centered at wavelengths $\lambda_1, \lambda_2, \ldots \lambda_N$, that is transmitted through optical fiber 82. The input signal 11 may originate from a light source or tapped off an optical network (not shown). The circulator 12 directs the input signal 11 in a clockwise direction to a second port 83 of the circulator. The input signal 11 exits the second port 83 and propagates through optical fiber 85 to grating elements 14 of the grating units 10.

A select number of grating elements 10 are tuned to reflect corresponding optical channels of the input signal 11, effectively dropping the corresponding optical channel from the input signal 11. The remaining optical grating units 10 are tuned or parked to pass the remaining optical channels of the Input signal 11, to provide an optical signal 86 that does not include the dropped optical channels. For example, as shown in FIG. 3, a pair of grating units 10 are respectively tuned to reflect an optical signal having optical channels centered at wavelengths $\lambda_2, \lambda_3$, while the remaining gating units 10 are parked or tuned to pass the remaining channels centered at wavelengths $\lambda_1, \lambda_4, \ldots \lambda_N$. The grating units 10 may be parked by tuning the grating units such that the filter function of the grating 20 is parked between optical channels, parked outside of the range of optical channels of the input signal 11, or parked at the same wavelength of the grating of another grating unit, which is tuned to reflect an optical signal.

The reflected optical channels propagate back to the second part 83 of the circulator 12, which then directs the reflected channels to a third port 87 of the circulator and through optical fiber 88 to provide a drop optical signal 89.

FIG. 4 illustrates another embodiment of a tunable drop filter 90. The tunable drop filter 90 includes a plurality of tunable Bragg grating units 10, optically coupled in series to a port of an optical directing device 12, such as a 3-port circulator. At least one grating unit 10 is actuated to compress a respective grating element 14, and therefore, tune a respective grating 14 to pass the desired optical channel(s) to be dropped from the optical input signal 11, while the other grating units are tuned to reflect the remaining optical channels of the input signal, In the operation of the drop filter 90, a first port 91 of the circulator 12 receives the input signal 11, having optical channels centered at wavelengths $\lambda_1, \lambda_2, \ldots \lambda_N$, that is transmitted through optical fiber 92. The input signal 11 may originate from a light source or tapped off an optical network (not shown). The circulator 12 directs the input signal 11 in a counter-clockwise direction to a second port 93 of the circulator. The input signal 11 exits the second port 93 and propagates through optical fiber 94 to grating elements 14 of the grating units 10.

Each of the grating elements 14 are tuned or parked to pass corresponding optical channels of the input signal 11, effectively dropping the corresponding optical channels from the input signal. A select number of optical grating units are tuned to reflect the remaining optical channels of the input signal 11 to provide an optical signal 98, which does not include the dropped optical channels. For example as shown in FIG. 4, each of the grating units 10 are respectively tuned or parked to pass an optical signal 95 having a optical channels centered at wavelengths $\lambda_2, \lambda_3$, while a select number of grating units are tuned to reflect the remaining channels centered at wavelengths $\lambda_1, \lambda_4, \ldots \lambda_N$.

The reflected optical channels centered at $\lambda_2, \lambda_3$ propagate back to the second port 93 of the circulator 12, which then directs the reflected channels to a third port 96 of the circulator and through optical fiber 97 to provide an output optical signal 98.

Figure 5:
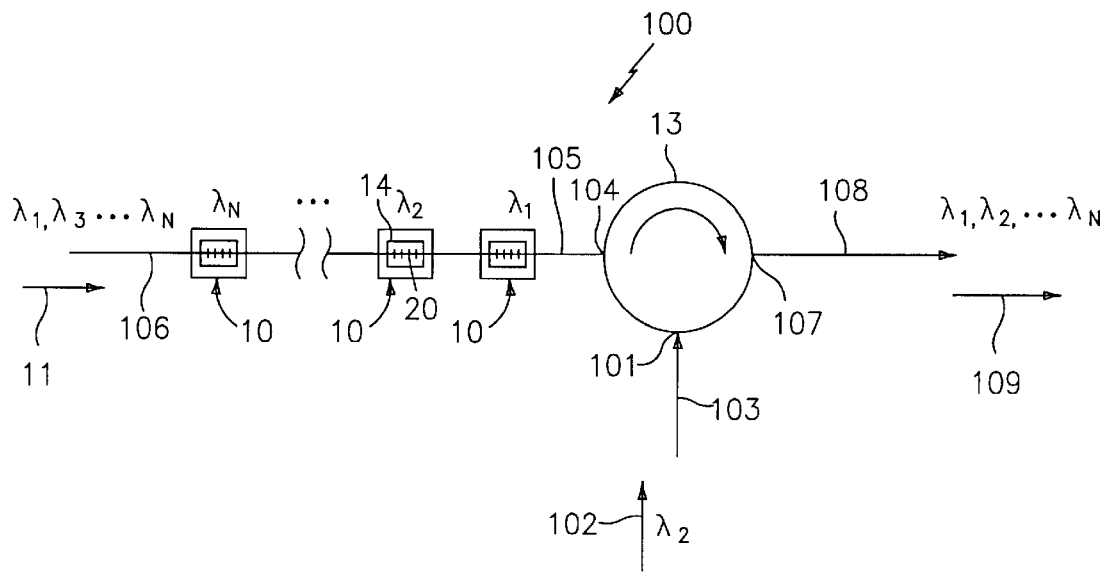
FIG. 5 is a block diagram of a tunable add filter in accordance with the present invention.

Referring to FIG. 5, the tunable add filter 100 includes a plurality of tunable Bragg grating units 10 optically coupled in series to a port of an optical directing device 13, such as a 3-port circulator. At least one grating unit 10 is actuated to compress a respective grating element 14, and therefore, tune a respective grating 20 to reflect the desired optical channel(s) to be added to the optical input signal 11, while the other grating units are tuned to pass the optical channels of the input signal.

In the operation of the add filter 100, a first port 101 of the circulator 13 receives the optical signal 102 to be added to the input signal 11. The added signal 102 has, for example, a single optical channel centered at wavelength $\lambda_2$ that is transmitted through optical fiber 103. The circulator 13 directs the added optical signal 102 in a clockwise direction to a second port 104 of the circulator. The added optical signal 102 exits the second port 104 and propagates through optical fiber 105 to grating elements 14 of the grating units 10. At least one grating element 14 is tuned to reflect the added signal 102 to be combined with the input signal 11. The input light 11, having optical chapels centered at wavelengths $\lambda_1, \lambda_3, \ldots \lambda_N$, are transmitted to the grating elements 14 of the grating units 10 through optical fiber 106. The grating elements 14 are tuned or parked to pass the optical channels of the input signal 11 and combine with the added optical signal 102 to provide an optical signal 109 having optical channels centered at wavelengths $\lambda_1, \lambda_2, \ldots \lambda_N$.

The combined optical light propagates back to the second port 104 of the circulator 13, which then directs the combined optical light to a third port 107 of the circulator 13 and through optical fiber 108 to provide the output signal 109, having optical channels centered at wavelengths $\lambda_1, \lambda_2, \ldots \lambda_N$.

While the add filter 100 of FIG. 5 adds a single channel to the input light 11, one skilled in the art will appreciate and recognize that more than one optical signal may be added provided the add filter has a corresponding number of grating units 10, or a single grating unit that has sufficient bandwidth to reflect adjacent optical channels to be added.

Figure 6:
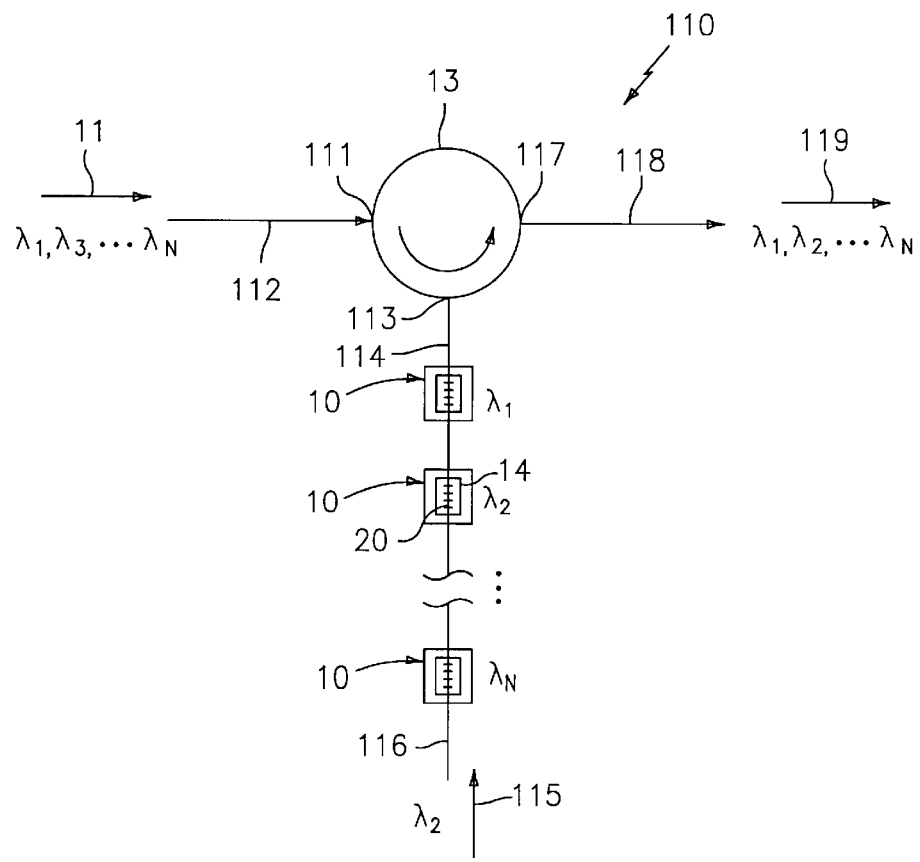
FIG. 6 is a block diagram of another embodiment of a tunable add filter in accordance with the present invention.

FIG. 6 illustrates another embodiment of a tunable add filter 110. The tunable add filter 110 includes a plurality of tunable Bragg grating units 10, optically coupled in series to a port of an optical directing device 13, such as a 3-port circulator. The grating units 10 are actuated to compress respective grating elements 14, and therefore, tune or park gratings 20 to pass the desired optical channel(s) to be added to the optical input signal 11, while the other grating units 10 are tuned to reflect and combine the channels of the input signal 11.

In the operation of the add filter 110, a first port 111 of the circulator 13 receives the input signal 11, having optical channels centered at wavelengths $\lambda_1, \lambda_3, \ldots \lambda_N$, that is transmitted through optical fiber 112. The input signal 11 may originate from a light source or lapped off an optical network (not shown). The circulator 13 directs the input signal 11 in a counter-clockwise direction to a second port 113 of the circulator. The input signal 11 exits the second port 113 and propagates through optical fiber 114 to the grating elements 14 of the grating units 10. A select number of grating elements 14 are tuned to reflect the optical channels of the input signal 11 centered at wavelengths $\lambda_1, \lambda_3, \ldots \lambda_N$ of the gratings 20 to be combined with an optical added signal 115. The added signal 115, having an optical channel centered at wavelength $\lambda_2$, are transmitted to the grating elements 14 of the grating units 10 through optical fiber 116. Each grating unit 10 is tuned or parked to pass the optical channel(s) of the added signal 115, which is then combined with the optical input signal 11 to provide a combined optical signal having optical channels centered at $\lambda_1, \lambda_2, \ldots \lambda_N$.

The combined optical signal propagates back to the second port 113 of the circulator 13, which then directs the combined optical light to a third port 117 of the circulator 13 and through optical fiber 118 to provide the output signal 119, having optical channels centered at wavelengths $\lambda_1,\lambda_2, \ldots \lambda_N$.

Figure 7:
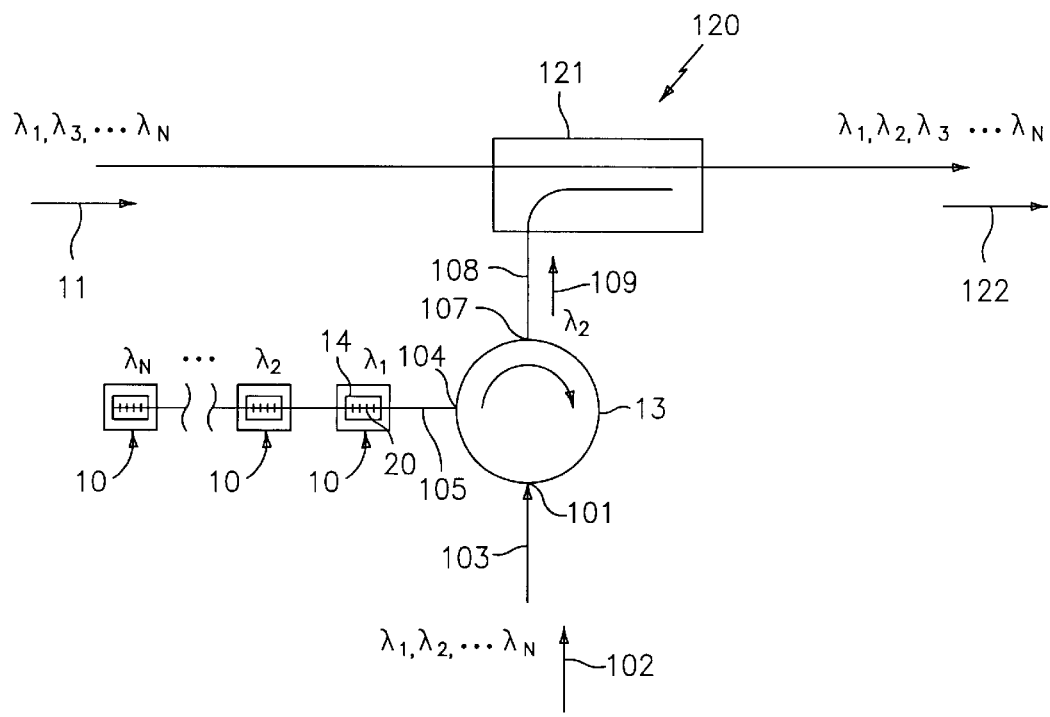
FIG. 7 is a block diagram of another embodiment of a tunable add filter in accordance with the present invention.

Referring to FIG. 7, the tunable add filter 120 is similar to the tunable add filter of FIG. 5, and therefore, like components have the same reference number. The tunable add filter 120 includes a plurality of tunable Bragg grating units 10 optically coupled in series to a port of an optical directing device 13, such as a 3-port circulator. At least one grating unit 10 is actuated to compress a respective grating element 14, and therefore, tune a respective grating 20 to reflect the desired optical channel(s) to be added to the optical input signal 11, while the other grating units 10 are tuned or parked to pass the remaining optical channels of the input signal 11.

In the operation of the add filter 120, a first port 101 of the circulator 13 receives the added optical signal 102 to be added to the input signal 11. The added signal 102 may, for example, include a plurality of optical channels centered at wavelengths $\lambda_1,\lambda_2, \ldots \lambda_N$, any of which that may be added to the input signal 11. The added signal 102 is transmitted through optical fiber 103 to the circulator 13, which then directs the added optical signal 102 in a clockwise direction to a second port 104 of the circulator. The added optical signal 102 exits the second port 104 and propagates through optical fiber 105 to grating elements 14 of the grating units 10. At least one grating element 14 is tuned to reflect at least one optical channel of the added signal 102. For example, one grating unit 10 may be tuned to reflect an optical channel centered at wavelength $\lambda_2$ to provide a filtered added signal 109. The other grating elements are tuned or parked to pass the remaining optical channels of the added optical signal 102.

The filtered added signal propagates back to the second port 104 of the circulator 13, which then directs the combined optical light to a third port 107 of the circulator 13 and through optical fiber 108 to provide the filtered added signal 109. The output signal 109 is then transmitted to an input port of an optical coupler 121. The input signal 11, having optical channels centered at wavelengths $\lambda_1,\lambda_3, \ldots \lambda_N$, are transmitted to a second input port of the optical coupler 121. The optical coupler 121 combines the filtered added signal 109 and the input signal 11 and provides a combined optical signal 122 at an output port of the coupler, wherein the combined output signal 122 includes a plurality of channels centered at wavelengths $\lambda_1,\lambda_2, \ldots \lambda_N$.

While the add filter 120 of FIG. 7 adds a single channel to the input light 11, one skilled in the art will appreciate and recognize that more than one optical signal may be added provided the add filter has a corresponding number of grating units 10, or a single grating unit that has sufficient bandwidth to reflect adjacent optical channels to be added.

Figure 8:
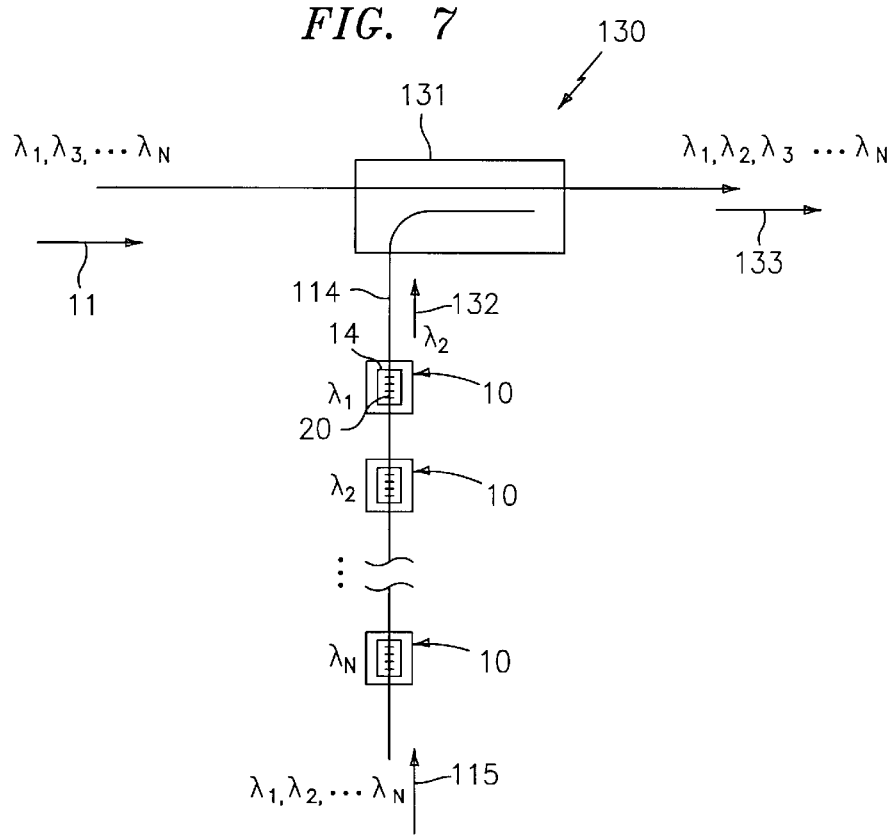
FIG. 8 is a block diagram of another embodiment of a tunable add filter in accordance with the present invention.

Referring to FIG. 8, the tunable add filter 130 is similar to the tunable add filter 110 of FIG. 6, and therefore, like components have the same reference number. The tunable add filter 130 includes a plurality of tunable Bragg grating units 10 optically coupled in series to a port of an optical directing device 131, such as an optical coupler. Each of the grating units 10 are actuated to compress respective grating elements 14, and therefore, tune or park gratings 20 to pass the desired optical channel(s) to be added to the optical input signal 11.

In the operation of the add filter 110, the added signal 115 may, for example, include a plurality of optical channels centered at wavelengths $\lambda_1,\lambda_2, \ldots \lambda_N$, any of which that may be added to the input signal 111. The added signal 115 is transmitted to the grating elements 14 of the grating units 10 through optical fiber 116. Each grating unit 10 is tuned or parked to pass a selected optical channel(s) of the added signal 115 to be added to the input signal 11. For example, each grating unit 10 may be tuned to pass an optical channel at wavelength $\lambda_2$ to provide a filtered added signal 132. The filtered added signal 132 is then transmitted to an input port of an optical coupler 131 through optical fiber 114. The optical coupler 131 combines the filtered added signal 132 and the input signal 11 and provides a combined optical signal 133 at an output port of the optical coupler 131, wherein the combined output signal 133 includes a plurality of channels centered at wavelengths $\lambda_1,\lambda_2, \ldots \lambda_N$.

While the add filter 130 of FIG. 8 adds a single channel to the input light 11, one skilled in the art will appreciate and recognize that more than one optical signal maybe added.

Figure 9:
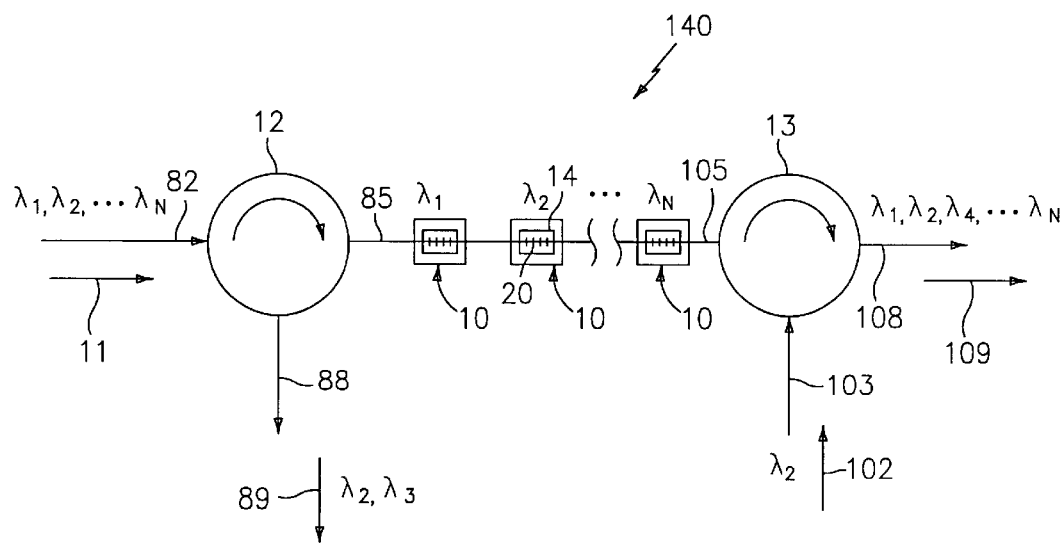
FIG. 9 is a block diagram of a reconfigurable optical add/drop multiplexer (ROADM) in accordance with the present invention.

FIG. 9 illustrates a reconfigurable optical add/drop multiplexer (ROADM) 140 that effectively combines the tunable drop filter 80 of FIG. 3 and the tunable add filter 100 of FIG. 5, wherein a single series of grating units 10 are used to both drop a selected optical channel and add a selected optical channel, as discussed hereinbefore. Components similar to the drop filter 80 of FIG. 3, the add filter 100 of FIG. 5 and the ROADM 140 of FIG. 9 have the same reference number.

As shown in FIG. 9, a pair of grating units 10 are tuned to reflect optical channels centered at wavelengths $\lambda_2,\lambda_3$, while the other gratings units are tuned to pass the remaining channels centered at wavelengths $\lambda_2,\lambda_3, \ldots \lambda_N$. Consequently, the ROADM 140 drops optical channels centered at wavelengths $\lambda_2,\lambda_3$, and adds the added optical signal 102 having a channel centered at wavelengths $\lambda_2$. The output signal 109, therefore, includes optical channels centered at $\lambda_1,\lambda_2,\lambda_4, \ldots \lambda_N$.

Figure 10:
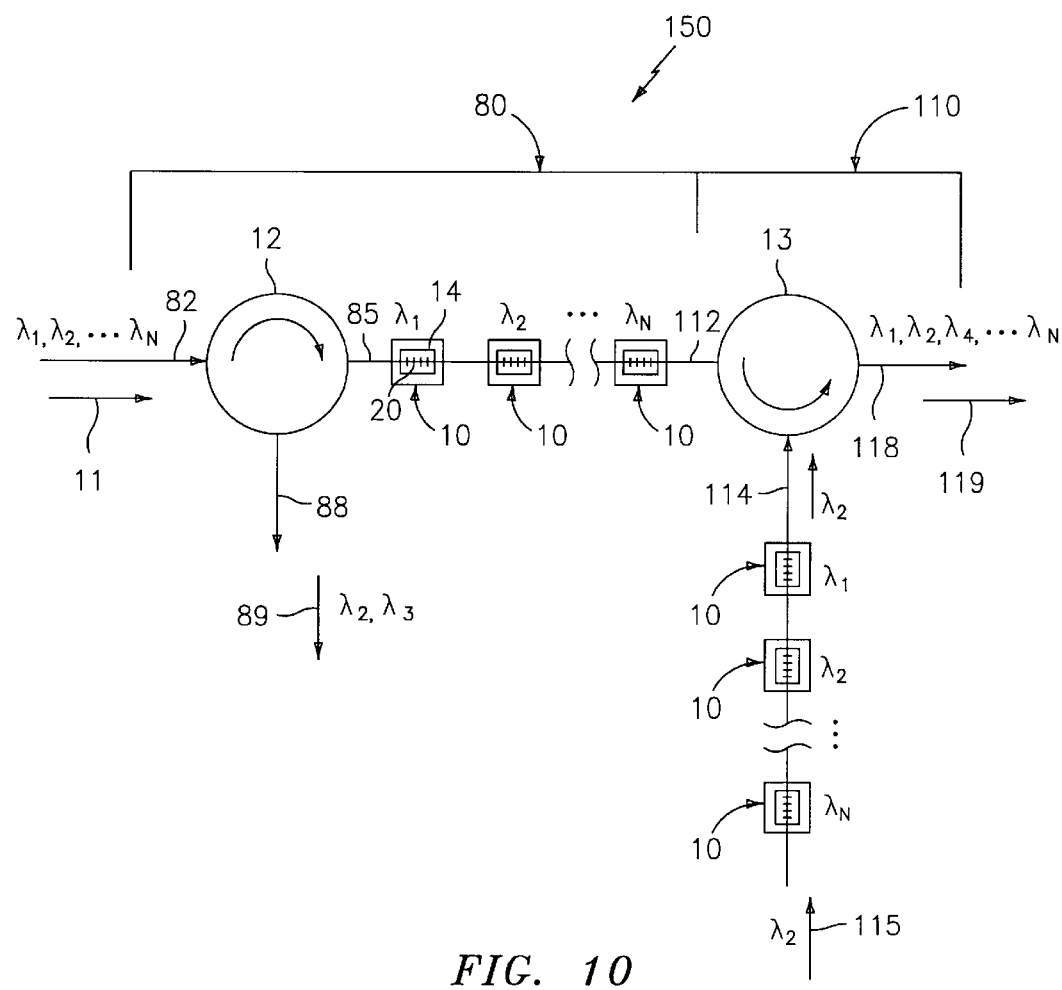
FIG. 10 is a block diagram of another embodiment of a reconfigurable optical add/drop multiplexer (ROADM) in accordance with the present invention.

FIG. 10 illustrates a reconfigurable optical add/drop multiplexer (ROADM) 150 that effectively combines the tunable drop filter 80 of FIG. 3 and the tunable add filter 110 of FIG. 6, wherein the add filter 110 is optically connected in series with the drop filter 80. The drop and add filters 80,110 functions substantially the same, as discussed hereinbefore. Components similar to the drop filter 80 of FIG. 3, the add filter 110 of FIG. 6 and the ROADM 150 of FIG. 10 have the same reference number.

As shown in FIG. 10, a pair of grating units 10 of the drop filter 80 are tuned to reflect optical channels centered at wavelengths $\lambda_2,\lambda_3$, while the other gratings units are tuned to pass the remaining channels centered at wavelengths $\lambda_1,\lambda_4, \ldots \lambda_N$. The grating units 10 of the add filter 110 are tuned to pass the added signal 115, having an optical channel centered at $\lambda_2$. Consequently, the ROADM 150 drops optical channels centered at wavelengths $\lambda_2,\lambda_3$, and adds the added optical signal 115 having a channel centered at wavelengths $\lambda_2$. The output signal 119, therefore, includes optical channels centered at $\lambda_1,\lambda_2,\lambda_4, \ldots \lambda_N$.

Figure 11:
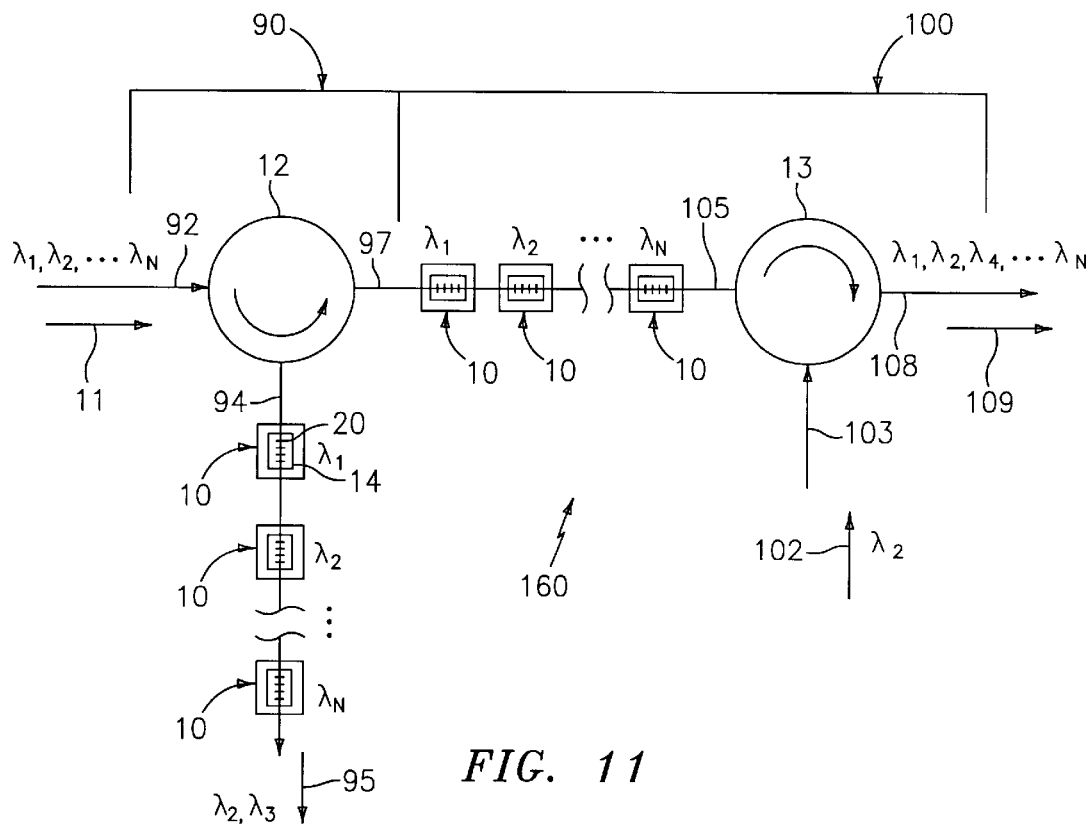
FIG. 11 is a block diagram of another embodiment of a reconfigurable optical add/drop multiplexer (ROADM) in accordance with the present invention.

FIG. 11 illustrates a reconfigurable optical add/drop multiplexer (ROADM) 160 that effectively combines the tunable drop filter 90 of FIG. 4 and the tunable add filter 100 of FIG. 5, wherein the add filter 100 is optically connected in series with the drop filter 90. The drop and add filters 90,100 functions substantially the same, as discussed hereinbefore. Components similar to the drop filter 90 of FIG. 4, the add filter 100 of FIG. 5 and the ROADM 160 of FIG. 11 have the same reference number.

As shown in FIG, 10, each of the grating units 10 of the drop filter 90 are tuned to pass optical channels centered at wavelengths $\lambda_2,\lambda_3$, while the other gratings units are tuned to reflect the remaining channels centered at wavelengths $\lambda_1,\lambda_4, \ldots \lambda_N$. The grating units 10 of the add filter 100 are tuned to reflect the added signal 102, having an optical channel centered at $\lambda_2$. Consequently, the ROADM 160 drops optical channels centered at wavelengths $\lambda_2,\lambda_3$, and adds the added optical signal 102 having a channel centered at wavelengths $\lambda_2$. The output signal 108, therefore, includes optical channels centered at $\lambda_1,\lambda_2,\lambda_4, \ldots \lambda_N$.

Figure 12:
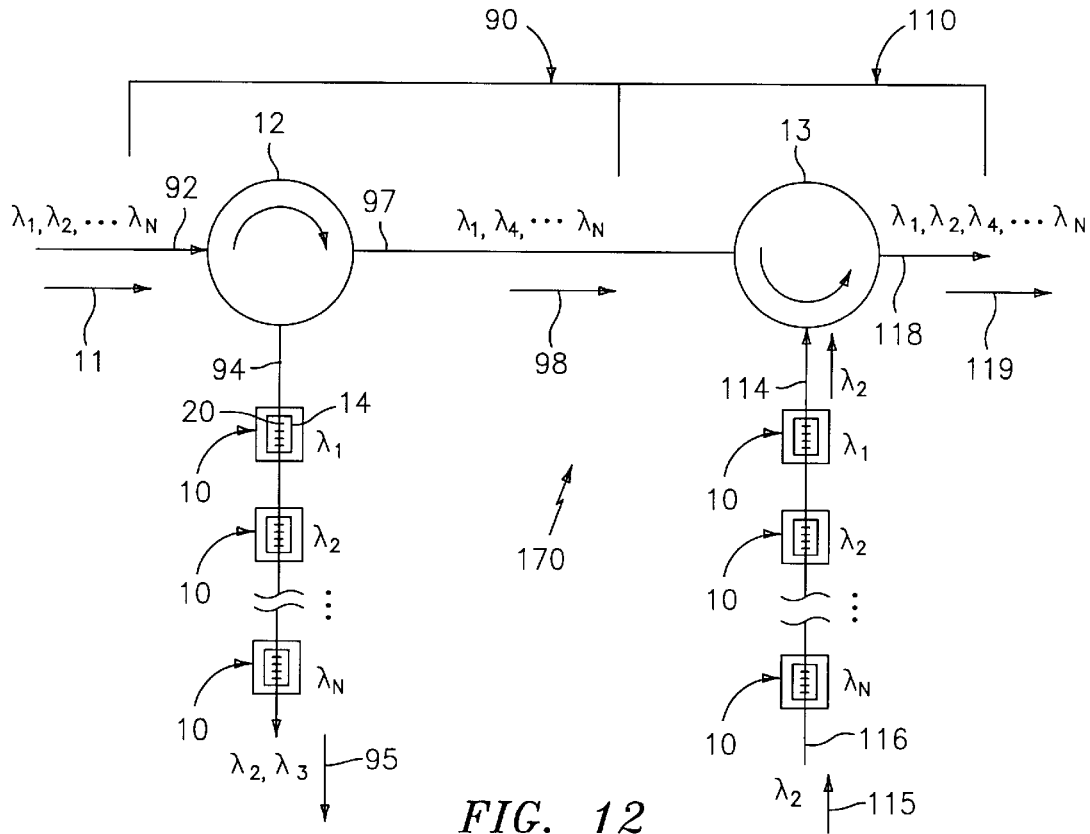
FIG. 12 is a block diagram of another embodiment of a reconfigurable optical add/drop multiplexer (ROADM) in accordance with the present invention.

FIG. 12 illustrates a reconfigurable optical add/drop multiplexer (ROADM) 170 that effectively combines the tunable drop filter 90 of FIG. 4 and the tunable add filter 110 of FIG. 6, wherein the add filter 110 is optically connected in series with the drop filter 90. The drop and add filters 90,110 functions substantially the same, as discussed hereinbefore. Components similar to the drop filter 90 of FIG. 4, the add filter 110 of FIG. 6 and the ROADM 170 of FIG. 12 have the same reference number.

As shown in FIG. 12, each of the grating units 10 of the drop filter 90 are tuned to pass optical channels centered at wavelengths $\lambda_2,\lambda_3$, while the other gratings units are tuned to reflect the remaining channels centered at wavelengths $\lambda_1,\lambda_4, \ldots \lambda_N$. Each of the grating units 10 of the add filter 110 are tuned to pass the added signal 115, having an optical channel centered at $\lambda_2$, while the other gratings units are tuned to reflect the remaining channels centered at wavelengths $\lambda_1,\lambda_4, \ldots \lambda_N$. Consequently, is the ROADM 170 drops optical channels centered at wavelengths $\lambda_2,\lambda_3$, and adds the added optical signal 115 having a channel centered at wavelengths $\lambda_2$. The output signal 119, therefore, includes optical channels centered at $\lambda_1,\lambda_2,\lambda_4, \ldots \lambda_N$.

Figure 13:
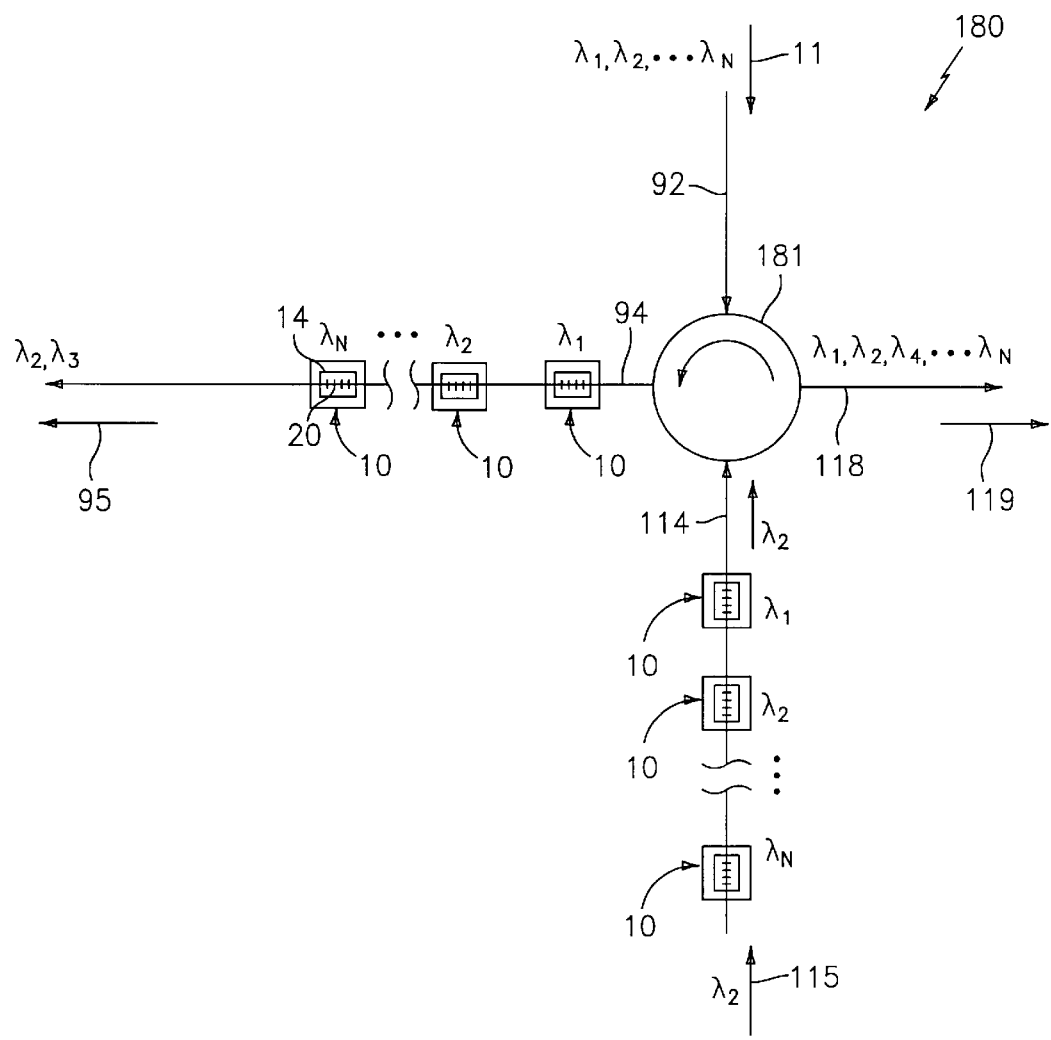
FIG. 13 is a block diagram of another embodiment of a reconfigurable optical add/drop multiplexer (ROADM) in accordance with the present invention.

FIG. 13 illustrates a reconfigurable optical add/drop multiplexer (ROADM) 170 is substantially similar to the ROADM 160 of FIG. 12, which effectively combines the tunable drop filter 90 of FIG. 4 and the tunable add filter 110 of FIG. 6. Effectively, the ROADM has substituted the pair of 3-port circulators 12, 13 with a single 4-port circulator 181. The ROADM 180 of FIG. 13 operates substantially the same as the ROADM 170 of FIG, 12, as discussed hereinbefore. Components similar to the drop filter 90 of FIG, 4, the add filter 110 of FIG. 6 and the ROADM 170 of FIG. 12 have the same reference number, In addition to the above embodiments of an ROADM, the present invention also contemplates other ROADM configurations by optically connecting in series in various combinations of any one of the tunable drop filters 80,90 of FIGS. 3 and 4 respectively, with any one of the tunable add filters 120,130 of FIGS. 7 and 8 respectively.

While the grating units 10 are interconnected to a 4-port circulator, one will appreciate that it is within the scope of the present invention that any other optical directing device or means may be substituted for the circulator 12,13, such as an optical coupler, optical splitter or free space.

The dimensions and geometries for any of the embodiments described herein are merely for illustrative purposes and, as much, any other dimensions may be used if desired, depending on the application, size, performance, manufacturing requirements, or other factors, in view of the teachings herein, It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein without departing from the spirit and scope of the present invention.

What is claimed is:

1. An optical drop filter comprising:
   a compression-tuned optical device including:
      an optical waveguide including an inner core disposed within an outer cladding and a grating disposed within the inner core, the grating reflecting a first reflection wavelength of light back alone the inner core and propagating remaining wavelengths of light through the grating, the optical waveguide including a pair of opposing surfaces; and
      a compressing device compresses the opposing surfaces towards each other to tune the grating to change the reflection wavelength of light reflected back along the inner core; and
      an optical directing device for providing an input optical signal to the compression-tuned optical device, the input optical signal having a plurality of optical channels centered at spaced wavelengths;
   whereby the compression-tuned optical device removes an optical channel from the input optical signal.

2. The filter of claim 1 further comprising a plurality of compression-tuned optical devices optically connected in series.

3. The filter of claim 1 wherein the compression-tuned optical device is dynamically tuned to reflect at least one optical channel to be removed from the input optical signal, and passing the remaining optical channels of the input optical signal.

4. The filter of claim 1 wherein the compression-tuned optical device is dynamically tuned to pass at least one optical channel to be removed from the input optical signal, and reflecting the remaining optical channels of the input optical signal.

5. The filter of claim 1 wherein the optical waveguide has outer dimensions along perpendicular axial and transverse directions, the outer dimension being at least 0.3 mm along the transverse direction.

6. The filter of claim 1 wherein at least a portion of the optical waveguide has a transverse cross-section that is contiguous and comprises a substantially homogeneous material.

7. The filter of claim 6 wherein the homogeneous material comprises a glass material.

8. The filter of claim 1 wherein the optical waveguide is cane.

9. The filter of claim 1 wherein at least a portion of the optical waveguide comprises a generally cylindrical shape, having a diameter being at least 0.3 mm.

10. The filter of claim 1 wherein the grating has a characteristic wavelength and wherein the optical wavguide comprises a shape that provides a predetermined sensitivity to a shift in the wavelength due to a change in force on the optical waveguide.

11. The filter of claim 10 wherein the shape of the optical waveguide comprises a generally dogbone shape.

12. The filter of claim 1, wherein the compressing device comprises an actuator for applying axially a compressive force against at least one of the opposing surfaces of the optical waveguide.

13. The filter of claim 1, wherein an outer dimension of the optical waveguide along an axial direction is greater than an outer dimension of the optical waveguide along an transverse direction.

14. The filter of claim 1, wherein the inner core is a single mode core.

15. The filter of claim 1 wherein the compression-tuned optical device passively tunes the optical waveguide in response to a temperature change to maintain the reflection wavelength over a predetermined temperature range.

16. An optical add filter comprising:
   is a compression-tuned optical device including:
      an optical waveguide including an inner core disposed within an outer cladding and a grating disposed within the inner core, the grating reflecting a first reflection wavelength of light back along the inner core and propagating remaining wavelengths of light through the grating, the optical waveguide including a pair of opposing surfaces; and
      a compressing device compresses the opposing surfaces towards each other to tune the grating to change the reflection wavelength of light reflected back along the inner core; and
      an optical directing device optically connected to the compression-tuned optical device for combining an input optical signal and an added optical channel, the input optical signal having a plurality of optical channels centered at spaced wavelengths;
      whereby the compression-tuned optical device provides the optical channel to be combined with the input optical signal to provide a combined output signal.

17. The filter of claim 1 further comprising a plurality of compression-tuned optical devices optically connected in series.

18. The filter of claim 1 wherein the compression-tuned optical device is dynamically tuned to reflect at least one optical channel to be added to the input optical signal, and passing the remaining optical channels of the input optical signal.

19. The filter of claim 1 wherein the compression-tuned optical device is dynamically tuned to reflect at least one optical channel to be added to the input optical signal, and passing the remaining optical channels of the input optical signal.

20. The filter of claim 1 wherein the optical waveguide has outer dimensions along perpendicular axial and transverse directions, the outer dimension being at least 0.3 mm along the transverse direction.

21. The filter of claim 1 wherein at least a portion of the optical waveguide has a transverse cross-section that is contiguous and comprises a substantially homogeneous material.

22. The filter of claim 21 wherein the homogeneous material comprises a glass material.

23. The filter of claim 1 wherein the optical waveguide is cane.

24. The filter of claim 1 wherein at least a portion of the optical waveguide comprises a generally cylindrical shape, having a diameter being at least 0.3 mm.

25. The filter of claim 1 wherein the grating has a characteristic wavelength and wherein the optical waveguide comprises a shape that provides a predetermined sensitivity to a shift in the wavelength due to a change in force on the optical waveguide.

26. The filter of claim 10 wherein the shape of the optical waveguide comprises a generally dogbone shape.

27. The filter of claim 1, wherein the compressing device comprises an actuator for applying axially a compressive force against at least one of the opposing surfaces of the optical waveguide.

28. The filter of claim 1, wherein an outer dimension of the optical waveguide along an axial direction is greater than an outer dimension of the optical waveguide along an transverse direction.

29. The filter of claim 1 wherein the compression-tuned optical device passively tunes the optical waveguide in response to a temperature change to maintain the reflection wavelength over a predetermined temperature range.

30. An optical add/drop multiplexer comprising:
   a compression-tuned optical device including:
      a optical waveguide including an inner core disposed within an outer cladding and a grating disposed within the inner core, the grating reflecting a first reflection wavelength of light back along the inner core and propagating remaining wavelengths of light through the grating, the optical waveguide including a pair of opposing surfaces; and
      a compressing device compresses the opposing surfaces towards each other to tune the grating to change the reflection wavelength of light reflected back along the inner core; and
      a first optical directing device optically connected to the compression-tuned optical device for combining an input optical signal and an added optical channel, the input optical signal having a plurality of optical channels centered at spaced wavelengths;
      whereby the compression-tuned optical device provides the optical channel to be combined with the input optical signal to provide a combined output signal.

31. A compression-tuned fiber Bragg grating based reconfigurable wavelength add/drop module comprising:
   a large diameter optical waveguide having a longitudinal axis of compression with Bragg gratings imparted therein, the large diameter optical waveguide having at least a portion thereof with a transverse cross-section which is continuous and comprises a substantially homogeneous material, the at least a portion of which having an outer transverse dimension of at least 0.3 millimeters, the large diameter optical waveguide being responsive to an optical traffic signal, and further responsive to a compression force applied along the longitudinal axis of compression, for providing an optical waveguide signal having a selected wavelength of a channel to be added to or dropped from the optical traffic signal; and
   an axial compression force assembly, responsive to a control electronics signal containing information about the selected wavelength of the channel to be added to or dropped from the optical traffic signal, for providing the compression force applied along the longitudinal axis of compression of the large diameter optical waveguide.

32. A compression-tuned fiber Bragg grating based reconfigurable wavelength add/drop module according to claim 31, wherein the large diameter optical waveguide includes a glass tube having an optical fiber fused therein, the optical fiber having a core with the Bragg gratings spaced therein.

33. A compression-tuned fiber Bragg grating based reconfigurable wavelength add/drop module according to claim 31, wherein the large diameter optical waveguide includes a core with the Bragg gratings spaced therein.

34. A compression-tuned fiber Bragg grating based reconfigurable wavelength add/drop module according to claim 31, wherein the large diameter optical waveguide is a dogbone-shaped structure having wider end portions separated by a narrower intermediate portion.

35. A compression-tuned fiber Bragg grating based reconfigurable wavelength add/drop module according to claim 34, wherein the intermediate narrow portion has the Bragg gratings spaced therein.

36. A compression-tuned fiber Bragg grating based reconfigurable wavelength add/drop module according to claim 31,
wherein the compression force assembly includes a piezoelectric actuator arranged in a housing; and
wherein the large diameter optical waveguide is arranged between a wall of the housing and the piezoelectric actuator under slight compression.

37. A compression-tuned fiber Bragg grating based reconfigurable wavelength add/drop module according to claim 31, wherein the electronics control signal is an applied stepper voltage signal.

38. A compression-tuned fiber Bragg grating based reconfigurable wavelength add/drop module according to claim 32, wherein the longitudinal axis of compression is parallel with a longitudinal axis of the glass tube.

39. A compression-tuned fiber Bragg grating based reconfigurable wavelength add/drop module according to claim 33, wherein the longitudinal axis of compression is parallel with the longitudinal axis of the large diameter optical waveguide.

* * * * *